United States Patent
Bridges et al.

(10) Patent No.: US 10,513,821 B2
(45) Date of Patent: Dec. 24, 2019

(54) WATER-BASED SURFACE TREATMENT AGENT

(71) Applicants: DAIKIN INDUSTRIES, LTD., Osaka-shi, Osaka (JP); DAIKIN AMERICA, INC., Orangeburg, NY (US)

(72) Inventors: James Kasey Bridges, Athens, AL (US); Ronald O. Skidds, Cohutta, GA (US); Takashi Enomoto, Osaka (JP); Masahiro Miyahara, Osaka (JP)

(73) Assignees: DAIKIN INDUSTRIES, LTD., Osaka (JP); DAIKIN AMERICA, INC., Orangeburg, NY (US)

( * ) Notice: Subject to any disclaimer, the term of this patent is extended or adjusted under 35 U.S.C. 154(b) by 85 days.

(21) Appl. No.: 15/604,963

(22) Filed: May 25, 2017

(65) Prior Publication Data
US 2017/0342275 A1 Nov. 30, 2017

Related U.S. Application Data

(60) Provisional application No. 62/342,578, filed on May 27, 2016.

(51) Int. Cl.
| | |
|---|---|
| *C08F 220/18* | (2006.01) |
| *C09D 133/08* | (2006.01) |
| *D06N 3/04* | (2006.01) |
| *C09D 5/16* | (2006.01) |
| *D06M 15/263* | (2006.01) |
| *D06N 3/00* | (2006.01) |

(52) U.S. Cl.
CPC ............ *D06N 3/042* (2013.01); *C08F 220/18* (2013.01); *C09D 5/1637* (2013.01); *C09D 5/1668* (2013.01); *C09D 133/08* (2013.01); *D06M 15/263* (2013.01); *D06N 3/004* (2013.01); *C08F 2220/1891* (2013.01); *D06M 2200/01* (2013.01); *D06M 2200/11* (2013.01); *D06M 2200/12* (2013.01); *D06N 2203/041* (2013.01); *D06N 2205/023* (2013.01); *D06N 2209/142* (2013.01); *D06N 2209/145* (2013.01); *D06N 2209/146* (2013.01); *D06N 2211/066* (2013.01); *D10B 2401/021* (2013.01); *D10B 2503/04* (2013.01)

(58) Field of Classification Search
CPC ... C08F 220/18; C09D 5/1637; C09D 5/1668; C09D 133/08
USPC ........................................................ 524/560
See application file for complete search history.

(56) References Cited

U.S. PATENT DOCUMENTS

| | | | | |
|---|---|---|---|---|
| 5,238,736 A | * | 8/1993 | Tseng | C08F 22/105 428/327 |
| 2007/0292383 A1 | * | 12/2007 | Schepky | A61K 8/42 424/78.03 |
| 2010/0261840 A1 | * | 10/2010 | Breiner | C08F 220/18 524/832 |
| 2016/0298290 A1 | | 10/2016 | Baumann | |

* cited by examiner

*Primary Examiner* — Kelechi C Egwim
(74) *Attorney, Agent, or Firm* — Sughrue Mion, PLLC

(57) ABSTRACT

A surface treatment agent which is an aqueous emulsion containing: (a) a fluorine-free polymer including: (i) repeating units derived from a long-chain (meth)acrylate ester monomer represented by the formula: $CH_2=CA^{11}-C(=O)-O-A^{12}$, wherein $A^{11}$ is a hydrogen atom or a methyl group, and $A^{12}$ is a linear or branched aliphatic hydrocarbon group having 10-30 carbon atoms; (b) a surface active agent including both of a nonionic surface active agent and an anionic surface active agent, wherein the amount of the anionic surface active agent is at least 22% by weight, based on the total of the nonionic surface active agent and the anionic surface active agent; and (c) a liquid medium comprising water.

17 Claims, No Drawings

WATER-BASED SURFACE TREATMENT AGENT

CROSS REFERENCE TO RELATED APPLICATIONS

This application has priority from U.S. Application No. 62/342,578 filed May 27, 2016, disclosures of which are incorporated herein by reference.

BACKGROUND

A. Field of the Disclosure

The present invention relates to an aqueous surface treatment agent particularly a water- and oil-repellent agent, and a soil resistant agent.

B. Background

Conventionally, fluorine-containing water repellent and oil-repellent agents comprising fluorine compounds are known. The water- and oil-repellent agents show good water- and oil-repellency, when substrates such as textiles are treated with the water- and oil-repellent agents.

A report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] teaches that PFOA (perfluorooctanoic acid), one of long-chain fluoroalkyl compounds, is suspected to pose concerns to the environment. Under such a situation, the EPA announced on Apr. 14, 2003 that PFOA should be further investigated.

On the other hand, in the Federal Register (FR Vol. 68, No. 73/Apr. 16, 2003 [FRL-2303-8]) (http://www.epa.gov/opptintr/pfoa/pfoafr.pdf), the EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and the EPA OPPT FACT SHEET Apr. 14, 2003 (http://www.epa.gov/opptintr/pfoa/pfoafacts.pdf) announced that a "telomer" may possibly metabolize or decompose to PFOA (herein, the telomer means a long-chain fluoroalkyl group).

It is also announced that the "telomer" is used in a large number of commercial products including firefighting foams, care products and cleaning products as well as soil, stain and grease resistant coating on carpets, textiles, paper, and leather having the imparted water- and oil-repellency and soil resistance.

There is concern that such fluorine-containing compounds accumulate in the environment. Furthermore, in order to achieve water- and oil-repellency, after fluorine-containing polymers are adhered to substrates such as textiles, the substrate must be heat-treated at a high temperature (for example, 100° C. or more), requiring high energy and ruling out such treatment for substrates that are not stable at such temperatures. Furthermore, the fluorine-containing polymers are relatively expensive.

The fluorine-containing polymers are mainly used as a repellent agent for carpets. However, a fluorine-free repellent agent is desired in view of the environmental problem.

Therefore, there is a need in the art for water- and oil-repellant compositions that are not primarily composed free of fluorine-containing polymers or are free from the fluorine-containing polymers.

SUMMARY

To address the problems discussed above, a surface treatment agent is provided which gives excellent water- and oil-repellency and preferably does not include a fluorine-containing monomer, particularly a fluoroalkyl group-containing monomer.

A general embodiment of the surface treatment agent is an aqueous emulsion treatment agent comprising: a polymer comprising repeating units derived from a long-chain (meth)acrylate ester monomer, an anionic surface active agent, and a liquid medium comprising water. In some embodiments of the polymer comprising repeating units derived from a long-chain (meth)acrylate ester monomer, the polymer is a fluorine-free polymer comprising: repeating units derived from a long-chain (meth)acrylate ester monomer represented by the formula $CH_2=CA^{11}-C(=O)-O-A^{12}$, in which $A^{11}$ is a hydrogen atom or a methyl group, and $A^{12}$ is a linear or branched aliphatic hydrocarbon group having 10-30 carbon atoms. In some embodiments of the surface active agent, the agent comprises both a nonionic surface active agent and an anionic surface active agent, wherein the amount of the anionic surface active agent is at least 15% by weight, based on the total of the nonionic surface active agent and the anionic surface active agent.

A method of treating a textile is provided, comprising treating the textile with the surface treatment agent above.

A textile is provided, comprising a textile which has been treated with the surface treatment agent above.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

B. Treatment Agent

Since the treatment agent of the present invention preferably does not comprise a fluoroalkyl group-containing monomer, it does not have a concern of accumulation of a fluorine-containing compound in the environment. The treatment agent of the present invention gives excellent water- and oil-repellency to the substrate. Water- and oil-repellency is achieved by low-temperature treatment without necessity of heat treatment at a high temperature.

The treatment agent of the present invention has good stability as an emulsion, excellent durability (particularly washing durability) of water- and oil-repellency (particularly water repellency), and has good tactile properties.

Embodiments of the treatment agent comprising an active component which is only the fluorine-free polymer can give properties (particularly, water- and oil-repellency which includes initial water- and oil-repellency) which are equivalent or more to a treatment agent comprising an active component which is only a fluorine-containing polymer comprising a fluoroalkyl group-containing monomer as constitutional units.

1. Polymer

The polymer (preferably a fluorine-free polymer) comprises repeating units derived from a long-chain (meth) acrylate ester monomer. The polymer may be a copolymer, and may further comprise at least one type of repeating units selected from the group consisting of:

(b) repeating units derived from a short-chain (meth) acrylate ester monomer, (c) repeating units derived from a fluorine free crosslinkable monomer, and (d) repeating units derived from a halogenated olefin monomer.

Although the polymer may have a fluorine atom, the polymer is preferably free from a fluorine atom. That is, the polymer is preferably a fluorine-free polymer.

(a) Long-chain (Meth)Acrylate Ester Monomer

The long-chain (meth)acrylate ester monomer is a compound represented by the formula:

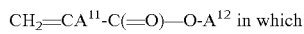

$CH_2=CA^{11}-C(=O)-O-A^{12}$ in which $A^{11}$ is a hydrogen atom or a methyl group, and $A^{12}$ is a linear or branched aliphatic hydrocarbon group having 10-30 carbon atoms.

The long-chain (meth)acrylate ester monomer does not have a fluoroalkyl group. Although the long-chain (meth) acrylate ester monomer may contain a fluorine atom, the long-chain (meth)acrylate ester monomer is preferably free from a fluorine atom.

Particularly preferably, $A^{11}$ is a methyl group.

$A^{12}$ is a linear or branched hydrocarbon group. Particularly, the linear or branched hydrocarbon group may be a linear hydrocarbon group. The number of carbon atoms of the linear or branched hydrocarbon group is 10-30. The linear or branched hydrocarbon group preferably has 16-28 or 18-28 carbon atoms, particularly 18 or 22 carbon atoms. Generally, the linear or branched hydrocarbon group is a saturated aliphatic hydrocarbon group, particularly an alkyl group.

Examples of the long-chain (meth)acrylate ester monomer include lauryl (meth)acrylate, myristyl (meth)acrylate, cetyl (meth)acrylate, stearyl (meth)acrylate and behenyl (meth)acrylate. Preferable examples of the long-chain (meth)acryiate ester monomer are stearyl (meth)acrylate and behenyl (meth)acrylate. Stearyl (meth)acrylate is particularly preferable.

The presence of the long-chain (meth)acrylate ester monomer increases water repellency and oil repellency imparted by the polymer.

(b) Short-chain (Meth)Acrylate Ester Monomer

The polymer may have repeating units derived from the short-chain (meth)acrylate ester monomer.

Preferably, the short-chain (meth)acrylate ester monomer is a compound represented by the formula:

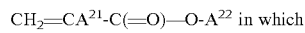

$CH_2=CA^{21}-C(=O)-O-A^{22}$ in which $A^{21}$ is a hydrogen atom or a methyl group, and $A^{22}$ is a linear or branched aliphatic hydrocarbon group having less than 10 carbon atoms.

The short-chain (meth)acrylate ester monomer does not have a fluoroalkyl group. Although the short-chain (meth) acrylate ester monomer may contain a fluorine atom, the short-chain (meth) acrylate ester monomer is preferably free from a fluorine atom.

Particularly preferably, $A^{21}$ is a methyl group.

$A^{22}$ is a linear or branched hydrocarbon group. Particularly, the linear or branched hydrocarbon group may be a linear hydrocarbon group. The number of carbon atoms of the linear or branched hydrocarbon group is 1-9. The linear or branched hydrocarbon group preferably has 1-8 carbon atoms. Generally, the linear or branched hydrocarbon group is a saturated aliphatic hydrocarbon group, particularly an alkyl group.

Examples of the short-chain (meth)acrylate ester monomer include methyl (meth)acrylate, ethyl (meth)acrylate, isopropyl (meth)acrylate, and t-butyl (meth)acrylate.

The presence of the short-chain (meth)acrylate ester monomer gives good water repellency and feeling imparted by the polymer.

(c) Fluorine-free Crosslinkable Monomer

The polymer may have or may not have repeating units derived from the fluorine-free crosslinkable monomer.

The fluorine-free crosslinkable monomer is a monomer free from a fluorine atom. The fluorine-free crosslinkable monomer may be a fluorine-free compound having at least one reactive group and/or olefinic carbon-carbon double bond (preferably a (meth)acrylate group). The fluorine-free crosslinkable monomer may be a compound which has at least two olefinic carbon-carbon double bonds, two reactive groups or at least one olefinic carbon-carbon double bond (preferably a (meth)acrylate group) and at least one reactive group. Examples of the reactive group include a hydroxyl group, an epoxy group, a chloromethyl group, a blocked isocyanate group, an amino group and a carboxyl group.

The fluorine-free crosslinkable monomer may be a mono (meth)acrylate, di(meth)acrylate, or mono(meth)acrylamide having a reactive group. Alternatively, the fluorine-free crosslinkable monomer may be di(meth)acrylate.

One example of the fluorine free crosslinkable monomer is a vinyl monomer having a hydroxyl group.

Examples of the crosslinkable monomer include, but are not limited to, diacetone(meth)acrylamide, N-methylol (meth)acrylamide, hydroxymethyl (meth)acrylate, hydroxyethyl (meth)acrylate, 3-chloro-2-hydroxypropyl (meth)acrylate, 2-acetoacetoxyethyl (meth)acrylate, butadiene, isoprene, chloroprene, monochlorovinyl acetate, vinyl methacrylate, glycidyl (meth)acrylate, 1,6-hexanediol di(meth)acrylate, and neopentylglycol di(meth)acrylate.

The presence of the fluorine free crosslinkable monomer imparts high washing durability given by the polymer.

(d) Halogenated Olefin Monomer

Preferably, the halogenated olefin is free from a fluorine atom.

Preferably, the halogenated olefin is an olefin having 2-20 carbon atoms and substituted by 1-10 chlorine atoms, bromine atoms or iodine atoms. Preferably, the halogenated olefin is a chlorinated olefin having 2-20 carbon atoms, particularly an olefin having 2-5 carbon atoms carbon and having 1-5 chlorine atoms. Preferable examples of the halogenated olefin are a vinyl halide such as vinyl chloride, vinyl bromide and vinyl iodide, and a vinylidene halide such as vinylidene chloride, vinylidene bromide and vinylidene iodide. Vinyl chloride is preferable.

The presence of the halogenated olefin imparts high washing durability given by the polymer.

(e) Other Monomer

Another monomer (e) other than the monomers (a)-(d), for example, a fluorine-free non-crosslinkable monomer, may be used.

Preferable examples of the other monomer are, for example, ethylene, vinyl acetate, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate and vinyl alkyl ether. The other monomer is not limited to these examples.

The fluorine-free polymer (1) may comprise a (meth) acrylate monomer having a cyclic hydrocarbon group, but preferably may not comprise the same.

The term "(meth)acrylate" as used herein means an acrylate or methacrylate, and the term "(meth)acrylamide" as used herein means an acrylamide or methacrylamide.

Preferably, each of the monomers is an acrylate ester, since the water- and oil-repellency becomes high.

Each of the monomers (a)-(e) may be used alone or in a combination of at least two.

The amount of the monomer (a) is preferably at least 40% by weight, more preferably at least 50% by weight, based on the polymer. The amount of the monomer (a) is preferably at most 95% by weight, for example, at most 80% by weight, at most 75% by weight, or at most 70% by weight, based on the polymer.

In the polymer, the amount of the repeating unit (b) is 0-150 parts by weight, preferably 1-30 parts by weight, the amount of the repeating unit (c) is 0-50 parts by weight, preferably 0.5-20 parts by weight, more preferably 1-10 parts by weight, the amount of the repeating unit (d) is 0-100 parts by weight, preferably 1-30 parts by weight, and the amount of the repeating unit (e) is 0-100 parts by weight, preferably 1-30 parts by weight, based on 100 parts by weight of monomer (a).

The number-average molecular weight (Mn) of the polymer may be 1,000 to 1,000,000, for example, from 5,000 to 500,000, particularly from 3,000 to 200,000. The number-average molecular weight (Mn) of the polymer can be generally measured by GPC (gel permeation chromatography).

The polymer may be one type of polymer, but the polymer may be a combination of at least two types of polymer.

In the present invention, the monomer is polymerized to obtain the treatment composition wherein the polymer is dispersed or dissolved in the medium.

The monomer used in the present invention may be as follows:
Monomer (a),
Monomer (a)+(b),
Monomer (a)+(c),
Monomer (a)+(b)+(c),
Monomer (a)+(d),
Monomer (a)+(b)+(d),
Monomer (a)+(c)+(d), or
Monomer (a)+(b)+(c)+(d).
In addition to the above, the monomer (e) may be used.

The fluorine-free crosslinkable monomer (c) is preferably used. Preferably, the monomer is a combination of the monomer (a)+the fluorine free crosslinkable monomer (c) (for example, a combination stearyl (meth)acrylate and glycidyl (meth)acrylate), or a combination of the monomer (a)+the fluorine free crosslinkable monomer (c)+the halogenated olefin monomer (d). In these combinations, the washing durability of the water-repellency is high.

2. Surface Active Agent (Surfactant)

In the treatment agent of the present invention, the surface active agent comprises a nonionic surface active agent and an anionic surface agent. The surface active agent may consist of the nonionic surface active agent and the anionic surface active agent, or may contain another surface active agent (other than the nonionic surface active agent and the anionic surface active agent). An example of the other surface active agents is an amphoteric surface active agent. Preferably, the surface active agent does not comprise a cationic surface active agent. The amount of the surface active agent may be from 1 to 20 parts by weight, particularly from 5 to 10 parts by weight, based on 100 parts by weight of the polymer. The amount of the anionic surface active agent is at least 15% by weight, preferably at least 22% by weight, more preferably at least 33% by weight, particularly at least 40% by weight, based on the total of the nonionic surface active agent and the anionic surface active agent. The amount of the anionic surface active agent may be at most 95% by weight, for example, at most 80% by weight, at most 70% by weight or at most 50% by weight, based on the total of the nonionic surface active agent and the anionic surface active agent.

a. Nonionic Surface Active Agent

Examples of the nonionic surface active agent include an ether, an ester, an ester ether, an alkanolamide, a polyhydric alcohol and an amine oxide.

Examples of the ether are a compound having an oxyalkylene group (preferably a polyoxyethylene group), a polyoxyethylene alkyl ether, and a polyoxyethylene alkyl phenyl ether.

An example of ester is an ester from an alcohol and a fatty acid. Examples of the alcohol is a monohydric to hexahydric (particularly dihydric to pentahydric) alcohol (for example, an aliphatic alcohol) having 1 to 50 carbon atoms (particularly 3 to 30 carbon atoms). An example of the fatty acid is a saturated or unsaturated fatty acid having 2 to 50 carbon atoms, particularly 5 to 30 carbon atoms. More specific examples of useful esters include a glycerin fatty acid ester, a sorbitan fatty acid ester, and a sucrose fatty acid ester.

An example of ester ether is a compound obtained by adding an alkylene oxide (particularly ethylene oxide) to an ester from an alcohol and a fatty acid. Examples of the alcohol is a monohydric to hexahydric (particularly dihydric to pentahydric) alcohol (for example, an aliphatic alcohol) having 1 to 50 carbon atoms (particularly 3 to 30 carbon atoms). An example of the fatty acid is a saturated or unsaturated fatty acid having 2 to 50 carbon atoms, particularly 5 to 30 carbon atoms.

An example of the alkanolamide is a compound formed from a fatty acid and an alkanolamine. The alkanolamide may be a monoalkanol amide or a dialkanol amide. An example of the fatty acid is a saturated or unsaturated fatty acid having 2 to 50 carbon atoms, particularly 5 to 30 carbon atoms. The alkanolamine may be an alkanol having 2-50, particularly 5-30 carbon atoms which has 1-3 amino groups and 1-5 hydroxyl groups.

The polyhydric alcohol may be a dihydric to pentahydric alcohol having 3-30 (or 10-30) carbon atoms. Examples include glycols, such as a polyoxyethylene polyoxypropylene glycol, a fatty acid polyethylene glycol, and a fatty acid polyoxyethylene sorbitan.

The amine oxide may be an oxide (for example, having 5-50 carbon atoms) of an amine (a secondary amine or preferably a tertiary amine)

Preferably, the nonionic surface active agent is a nonionic surface active agent having an oxyalkylene group (preferably polyoxyethylene group). Preferably, the carbon number of an alkylene group in the oxyalkylene group is from 2 to 10 carbon atoms. Preferably, the number of the oxyalkylene groups in a molecule of the nonionic surface active agent is generally from 2 to 100.

Preferably, the nonionic surface active agent is a nonionic surface active agent having an oxyalkylene group which is selected from the group consisting of an ether, an ester, an ester ether, an alkanolamide, a polyhydric alcohol and an amine oxide.

The nonionic surface active agent may include an alkylene oxide adduct of a linear and/or branched aliphatic (saturated and/or unsaturated) group, a polyalkylene glycol ester of linear and/or branched (saturated and/or unsaturated) fatty acid, a polyoxyethylene (POE)/polyoxypropylene (POP) copolymer (a random copolymer or a block copolymer), and an alkylene oxide adduct of acetylene glycol. Among them, preferable is one wherein a structure of an alkylene oxide addition portion and a polyalkylene glycol portion are polyoxyethylene (POE), polyoxypropylene (POP), or a POE/POP copolymer (which may be a random copolymer or may be a block copolymer).

Preferably, the nonionic surface active agent has a structure which does not have an aromatic group in view of environmental problems (such as biodegradability and environmental hormone).

The nonionic surface active agent may be a compound represented by the formula:

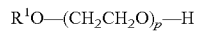

$R^1$ is an alkyl group having 1-22 carbon atoms, an alkenyl group having 2-22 carbon atoms, or an acyl group, $R^2$ each is independently, the same or different, an alkylene group having at least 3 (for example, 3-10) carbon atoms, $R^3$ is a hydrogen atom, an alkyl group having 1-22 carbon atoms, or an alkenyl group having 2-22 carbon atoms,
  p is a number of at least 1, and
  q is a number of 0 or at least 1.

The carbon number of the $R^1$ is preferably from 8 to 20, particularly from 10 to 18. Preferable examples of $R^1$ include a lauryl group, a tridecyl group and an oleyl group.

Examples of $R^2$ are a propylene group and a butylene group.

In the nonionic surface active agent, p may be a number of at least 3 (for example, 5-200), and q may be at least 2 (for example, from 5 to 200). That is, —$(R^2O)_q$— may form a polyoxyalkylene chain.

The nonionic surface active agent may be a polyoxyethylene alkylene alkyl ether containing a hydrophilic polyoxyethylene chain in center, and a hydrophobic oxyalkylene chain (particularly polyoxyalkylene chain). The hydrophobic oxyalkylene chain includes an oxypropylene chain, a oxybutylene chain and a styrene chain. The oxypropylene chain is preferable.

Preferable nonionic surface active agent is a surface active agent represented by the formula:

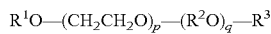

wherein $R^1$ and p are the same as defined above.
Specific examples of the nonionic surface active agent include:

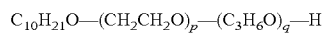

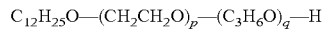

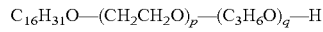

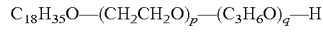

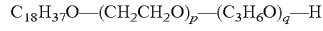

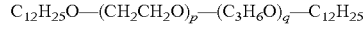

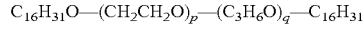

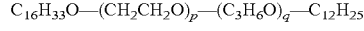

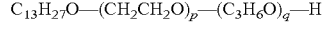

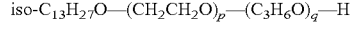

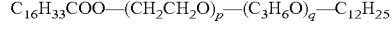

wherein p and q are the same as defined above.

Examples of the nonionic surface active agent include a condensation product of ethylene oxide with hexylphenol, isooctatylphenol, hexadecanol, oleic acid, alkane ($C_{12}$-$C_{16}$) thiol, sorbitan mono-fatty acid ($C_7$-$C_{19}$) or an alkyl ($C_{12}$-$C_{18}$)amine.

A ratio of the polyoxyethylene block may be 5 to 80% by weight, for example, 30 to 75% by weight, particularly 40 to 70% by weight, based on the molecular weight of the nonionic surface active agent (copolymer).

Generally, an average molecular weight of the nonionic surface active agent is 300-5,000, for example, 500-3,000.

The nonionic surface active agent may be used alone or in combination of at least two.

Preferably, the nonionic surface active agent is a combination of at least two. In the combination of at least two, at least one of the nonionic surface active agents may be a compound represented by $R^1O$—$(CH_2CH_2O)_p$—$(R^2O)_p$—$R^3$ [particularly $R^1O$—$(CH_2CH_2O)_p$—H] wherein $R^1$ group (and/or $R^3$ group) is a branched alkyl group (for example, an isotridecyl group). The amount of the nonionic surface active agent wherein the $R^1$ group is the branched alkyl group may be 5-100 parts by weight, for example, 8-50 parts by weight, particularly 10-40 parts by weight, based on 100 parts by weight of total of the nonionic surface active agent. In the combination of at least two, the rest of the nonionic surface active agents may be a compound represented by $R^1O—(CH_2CH_2O)_p—(R^2O)_q—R^3$ [particularly $R^1O—(CH_2CH_2O)_p—H$] wherein $R^1$ group (and/or $R^3$ group) is a (saturated and/or unsaturated) linear alkyl group (for example, a lauryl group (n-lauryl group)).

Examples of the nonionic surface active agent include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethylene glycerine fatty acid ester, polyglyceryl fatty acid ester, sucrose fatty acid ester, polyoxyethylene alkylamine, polyoxyethylene fatty acid amide, fatty acid alkylol amide, alkyl alkanolamide, acetylene glycol, an oxyethylene adduct of acetylene glycol, and a polyethylene glycol/polypropylene glycol block copolymer.

The nonionic surface active agent is preferably acetylene alcohol (particularly acetylene glycol) or an oxyethylene adduct of acetylene alcohol (particularly acetylene glycol), since a dynamic surface tension of the aqueous emulsion is low (that is, a water emulsion easily permeates a substrate).

A preferable nonionic surface active agent is an alcohol having an unsaturated triple bond, or an alkylene oxide adduct of this alcohol (both of this alcohol and this alkylene oxide adduct are referred to as "acetylene alcohol compound"). A particularly preferable nonionic surface active agent is an alkylene oxide adduct of a monool or polyol having an unsaturated triple bond.

The acetylene alcohol compound is a compound having at least one triple bond and at least one hydroxyl group. The acetylene alcohol compound may be a compound having a polyoxyalkylene portion. Examples of a polyoxyalkylene portion include a random addition structure of polyoxyethylene, polyoxypropylene, and polyoxyethylene and polyoxypropylene, and a block addition structure of polyoxyethylene and polyoxypropylene.

The acetylene alcohol compound may be a compound represented by the formula:

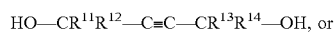

wherein each of $R^{11}$, $R^{12}$, $R^{13}$, $R^{14}$, $R^{15}$ and $R^{16}$ is independently, the same or different, a hydrogen atom, or an alkyl group having 1-30 carbon atoms. The acetylene alcohol compound may be an alkylene oxide adduct of the compound represented by this chemical formula. Preferably, the alkyl group is a linear or branched alkyl group of carbon numbers 1-12, particularly a linear or branched alkyl group of carbon numbers 6-12. Examples of the alkyl group include a methyl group, an ethyl group, a propyl group, a butyl group and an isobutyl group. Preferably, the alkylene oxide is an alkylene oxide having 1-20 (particularly 2-5) carbon atoms, such as ethylene oxide and propylene oxide. Preferably, the number of addition of alkylene oxide is 1-50.

Examples of the acetylene alcohol compound include acetylenediol, propargyl alcohol, 2,5-dimethyl-3-hexyne-2,5-diol, 3,6-dimethyl-4-octyne-3,6-diol, 2,4,7,9-tetramethyl-5-decyne-4,7-diol, 3,5-dimethyl-1-hexyn-3-ol, 3-methyl-1-butyn-3-ol, 3-methyl-1-pentyn-3-ol, 3-hexpe-2,5-diol and 2-butyne-1,4-diol. Polyethoxylate and the ethyleneoxide adduct of these specified compounds are also mentioned.

The nonionic surface active agent may not have a triple bond or may have a triple bond. The nonionic surface active agent may be either a nonionic surface active agent free from a triple bond, or a nonionic surface active agent having a triple bond. However, the nonionic surface active agent may be a combination of the nonionic surface active agent free from a triple bond, and the nonionic surface active agent having a triple bond. In the combination of the nonionic surface active agent free from a triple bond, and the nonionic surface active agent having a triple bond, a weight ratios of the nonionic surface active agent free from a triple bond (for example, a nonionic surface active agent having an oxyalkylene group) to the nonionic surface active agent having a triple bond (for example, an acetylene alcohol compound) may be 10:90-90:10, for example, 20:80-80:20.

b. Anionic Surface Active Agent

The anionic surface active agent may be a carboxylate salt, a sulfonate salt, a sulfate salt, a phosphate salt, or a combination thereof. The salt is usually a metal salt or an ammonium salt. Examples of the metal in the metal salt include potassium, sodium, calcium, barium and magnesium.

Examples of the anionic surfactants include an aliphatic monocarboxylate salt, a polyoxyethylene alkyl ether carboxylate salt, a N-acyl sarcosinate salt, a N-acyl glutamate salt, a dialkylsulfosuccinate salt, an alkanesulfonate salt, an alpha olefin sulfonate salt, a linear alkylbenzene sulfonate salt, a branched alkylbenzene sulfonate salt, a naphthalene sulfonate salt-formaldehyde condensate, an alkyl naphthalene sulfonate salt, a N-methyl-N-acyl taurine, an alkyl sulfate salt, a polyoxyethylene alkyl ether/sulfate salt, a fat and oil sulfuric ester salt, an alkyl phosphate salt, a polyoxyethylene alkyl ether phosphate salt, and a polyoxyethylene alkylphenylether phosphate salt.

3. Liquid Medium

The liquid medium may be water alone, or a mixture of water and an (water-soluble) organic solvent. The amount of the organic solvent may be at most 30% by weight (preferably at least 0.1%), for example, at most 10% by weight, based on the liquid medium. The liquid medium is preferably water alone.

4. Other Ingredients

The water- and oil-repellent composition of the present invention may contain only the above-mentioned fluorine-free polymer as the polymer (active ingredient). However, a fluorine-containing polymer may be contained in addition to the above-mentioned fluorine-free polymer. Generally, in the water- and oil-repellent composition (particularly an aqueous emulsion), particles formed from the fluorine-free polymer and particles formed from the fluorine-containing polymer are separately present. That is, preferably, the fluorine-free polymer and the fluorine-containing polymer are separately prepared and then the fluorine-free polymer and the fluorine-containing polymer are mixed. That is, preferably, an emulsion (particularly an aqueous emulsion) of the fluorine-free polymer and an emulsion (particularly an aqueous emulsion) of the fluorine-containing polymer are separately prepared and then the fluorine-free polymer emulsion and the fluorine-containing polymer emulsion are mixed.

The fluorine-containing polymer is a polymer having repeating units derived from a fluorine-containing monomer. The fluorine-containing monomer is preferably an acrylate ester or acrylamide represented by the general formula:

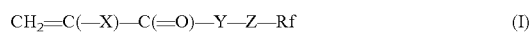

wherein X is a hydrogen atom, a linear or branched alkyl group having 1 to 21 carbon atoms, a fluorine atom, a chlorine atom, a bromine atom, an iodine atom, a CFX1X2 group (where each of X1 and X2 is a hydrogen atom, a fluorine atom, a chlorine atom, a bromine atom or an iodine atom), a cyano group, a linear or branched fluoroalkyl group having 1 to 20 carbon atoms, a substituted or unsubstituted benzyl group, or a substituted or unsubstituted phenyl group;

Y is —O— or —NH—;

Z is an aliphatic group having 1-10 carbon atoms, an aromatic group or cycloaliphatic group having 6-18 carbon atoms, a —$CH_2CH_2N(R^1)SO_2$— group (where $R^1$ is an alkyl group having 1-4 carbon atoms), a —$CH_2CH(OZ^1)CH_2$— group (where $Z^1$ is a hydrogen atom or an acetyl group), a —$(CH_2)_m$—$SO_2$—$(CH_2)_n$— group or a —$(CH_2)_m$—S—$(CH_2)_n$— group (where m is 1-10 and n is 0-10), Rf is a linear or branched fluoroalkyl group having 1 to 20 carbon atoms.

The carbon number of the Rf group is preferably from 1 to 6, particularly from 4 to 6.

The fluorine-containing polymer may have repeating units derived from at least one fluorine-free monomer selected from the group consisting of a halogenated olefin monomer, a fluorine-free non-crosslinkable monomer and a fluorine-free crosslinkable monomer.

Preferably, the halogenated olefin monomer is an olefin having 2-20 carbon atoms and substituted by 1-10 chlorine atoms, bromine atoms or iodine atoms. Examples of the halogenated olefin monomer are a vinyl halide such as vinyl chloride, vinyl bromide and vinyl iodide, and a vinylidene halide such as vinylidene chloride, vinylidene bromide and vinylidene iodide.

A preferable fluorine-free non-crosslinkable monomer is a compound represented by the formula:

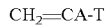

$CH_2$=CA-T wherein A is a hydrogen atom, a methyl group, or a halogen atom other than a fluorine atom (for example, a chlorine atom, a bromine atom, and an iodine atom), and T is a hydrogen atom, an open-chain or cyclic hydrocarbon group having 1 to 20 carbon atoms, or an open-chain or cyclic organic group having 1 to 20 carbon atoms and an ester bond.

Examples of the fluorine-free non-crosslinkable monomer include an alkyl (meth) acrylate ester, ethylene, vinyl acetate, acrylonitrile, styrene, a poly(ethylene glycol) (meth) acrylate, polypropyleneglycol (meth)acrylate, methoxypolyethyleneglycol (meth)acrylate, methoxypolypropyleneglycol (meth)acrylate and vinyl alkyl ether.

The fluorine-free crosslinkable monomer may be a compound which has at least two carbon-carbon double bonds (for example, (meth)acrylic groups) or a compound which has at least one carbon-carbon double bond and at least one reactive group.

A weight ratio of the fluorine-free polymer to the fluorine-containing polymer in the water- and oil-repellent composition may be 100:0-10:90, for example, 90:10-20:80, preferably 80:20-30:70.

Each of the fluorine-free polymer and the fluorine-containing polymer may be one type of polymer, but may be a combination of two types of polymers.

The use of the combination of the fluorine-free polymer and the fluorine-containing polymer gives performances (particularly water- and oil-repellency) which are equivalent to or better than the use of only the fluorine-containing polymer.

The treatment agent may further comprise micro-scale particulates to improve the overall performance. Without wishing to be bound by any particular hypothetical model, it is believed that the micro-scale particulates provide a fine structure on the surface of the substrate that aids in preventing dirt, oils, and other debris from sticking to the substrate. The micro-scale particulates can also be applied separately from the treatment agent, but the application process is simplified if they are applied together in a single step. The micro-scale particulates can be a wide variety of materials. Some embodiments of the micro-scale particulates comprise particles having a maximum diameter of about 100 μm. Further embodiments comprise particles having a maximum diameter of about 50 μm. Still further embodiments comprise particles having diameters of about 1-50 μm. The diameter means medium particle size which is measured by a laser diffraction particle size analyser.

For example, a product sold under the trade name CARBOSET GA-1087 (available from BF Goodrich of Cleveland, Ohio, USA) can be used for the micro-scale particulates, as well as other similar products sold under the trade name FLEXISPERSE PM-25 (available from innovative Chemical Technologies of Cartersville, Ga., USA), The product CARBOSET GA-1087 is a hard styrene acrylic copolymer which does not melt or form a film. The CARBOSET GA-1087 comes in an emulsion, and an emulsifying agent (such as sodium lauryl sulfate) provides quite stable aqueous emulsion of CARBOSET GA-1087 and treatment polymer. The CARBOSET GA-1087 may come with additional compounds that aid in the performance of the micro-scale particulates. FLEXISPERSE PM-25 is an anionic emulsion of acrylate particles, having an average diameter of about 56 nm and a glass transition temperature of about 95-145° C. Other materials that may be used for micro-scale particulates may include, but are not limited to, silicon oxide, poly methyl methacrylate or other polymers, epoxy resins, and various metals. The micro-scale particulates can be anionic, non-ionic, or cationic, as desired for the specific application. Anionic and non-ionic materials are beneficial for retaining the color of the substrate, and cationic materials are beneficial for blocking acid stains. Other benefits and limitations of the various types of micro-scale particulates and other treatment compounds are known in the art.

The present invention provides a surface treatment composition comprising the surface treatment agent, and an anionic emulsion comprising an anti-soiling polymer. The surface treatment composition may comprise the surface treatment agent and the anti-soiling polymer. The anti-soiling polymer is generally a fluorine-free polymer and is preferably an acrylate polymer. The acrylate polymer may comprise repeating units derived from (meth)acrylate ester and/or (meth)acrylic acid. The amount of the repeating units derived from (meth)acrylate ester and (meth)acrylic acid may be 30 to 100% by weight, for example, 40 to 90% by weight, based on the acrylate polymer. The anionic emulsion comprises one or both of an anionic polymer and an anionic surfactant. The anti-soiling polymer may comprise micro-scale particulates having a medium particle size of at most 100 μm, preferably at most 50 μm, more preferably about 1-50 μm. A weight ratio of the fluorine-free polymer in the surface treatment agent to the anti-soiling polymer in the anionic emulsion may be 1:99 to 90:10, preferably 3:97 to 80:20, more preferably 5:95 to 70:30, particularly 7:93 to 60:40, in the surface treatment composition. Preferably, the anti-soiling polymer has high hardness and non-film formability.

The polymer(s) (the fluorine-free polymer and the fluorine-containing polymer) in the present invention can be produced by any of conventional polymerization methods and the polymerization condition can be optionally selected. The polymerization methods include, for example, a solution polymerization, a suspension polymerization and an emulsion polymerization. The emulsion polymerization is preferable.

If the treatment agent of the present invention is an aqueous emulsion, the method of preparing the polymer is not limited. For example, the polymer is prepared by the solution polymerization, then the solvent is removed and the surface active agent and water are added to obtain the aqueous emulsion.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, sodium pyrosulfite, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer, and dissolves the monomer, and examples of the organic solvent include an ester (for example, an ester having 2-30 carbon atoms, specifically ethyl acetate and butyl acetate), a ketone (for example, a ketone having 2-30 carbon atoms, specifically methyl ethyl ketone and diisobutyl ketone), and an alcohol (for example, an alcohol having 1-30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, sodium pyrosulfite, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol, ethanol and N-methyl-2-pyrrolidone. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent may be used in the polymerization. The molecular weight of the polymer can be changed according to the amount of the chain transfer agent used. Examples of the chain transfer agent include a mercaptan group-containing compound (particularly alkyl mercaptan (for example, carbon numbers 1-30)), such as lauryl mercaptan, thioglycol and thioglycerol, and a mineral salt such as sodium hypophosphite and sodium hydrogen sulfite. The amount of the chain transfer agent may be within the range from 0.01 to 10 parts by weight, for example, from 0.1 to 5 parts by weight, based on 100 parts by weight of total of the monomers.

The treatment composition of the present invention may be in the form of a solution, an emulsion (particularly an aqueous dispersion) or an aerosol, but is preferably in the form of an aqueous dispersion. The treatment composition generally comprises the polymer (active ingredient of the surface treatment agent) and a medium (particularly a liquid medium, for example, an organic solvent and/or water). The amount of the medium may be, for example, from 5 to 99.9% by weight, particularly 10 to 80% by weight, based on the treatment composition. Specific embodiments of the treatment composition may be in the form of a textile treatment, a paint, a varnish, and a finish.

The concentration of the polymer may be from 0.01 to 95% by weight, for example, 5 to 50% by weight, based on the treatment composition.

C. Method of Treating a Textile

The treatment composition can be applied to a substrate to be treated by a known procedure. Usually, the treatment composition is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent (for example, a blocked isocyanate), followed by curing. It is also possible to add mothproofing agents, softeners, antimicrobial agents, flame retardants, antistatic agents, paint fixing agents, crease-proofing agents, etc. to the treatment composition. The concentration of the polymer in the treatment liquid contacted with the substrate may be from 0.01 to 10% by weight (particularly for immersion coating), for example, from 0.05 to 10% by weight, based on the treatment liquid.

The substrate to be treated with the treatment composition (for example, a water- and oil-repellent agent) of the present invention include a textile, masonry, a filter (for example, an electrostatic filter), a dust protective mask, a part of a fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyimide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be in any form such as a fiber and a fabric.

The treatment composition of the present invention can be used also as an internal mold release agent or an external mold release agent.

The polymer can be applied to fibrous substrates (such as textiles) by any known method to treat textiles with liquid. When the textile is a cloth, the cloth may be immersed in the solution or the solution may be adhered or sprayed to the cloth. The treated textiles are dried, preferably heated at a temperature between 100° C. and 200° C. in order to develop the oil repellency.

Alternatively, the polymer can be applied to a textile via a cleaning process, such as in a laundry application or dry cleaning process.

The textile which is treated is typically a fabric, including woven, knitted and nonwoven fabrics, fabrics in garment form and carpet, but may also be a fiber or yarn or intermediate textile product such as a sliver or roving. The textile material can be a natural fiber such as cotton or wool, a manmade fiber such as viscose rayon or lyocell or a synthetic fiber such as polyester, polyamide or acrylic fiber, or can be a mixture of fibers such as a mixture of natural and synthetic fibers. The polymeric product of the invention is particularly effective in rendering cellulosic fibers such as cotton or rayon oleophobic and oil repellent. The method of the invention generally also renders the textile hydrophobic and water repellent.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The term "treatment" means that the treatment agent is applied to the substrate by immersion, spray, coating or the like. The treatment gives the result that the polymer which is an active component of the treatment agent is penetrated into internal parts of the substrate and/or adhered to surfaces of the substrate.

Preferably, a zeta potential of the aqueous emulsion treatment agent is at least +30 mV. The zeta potential is measured with a laser Doppler method (ELS-8000 manufactured by Otsuka Electronics Co., Ltd.).

In some embodiments of the aqueous emulsion, a dynamic surface tension of the aqueous emulsion treatment agent is at most 55 mN/m. The dynamic surface tension is measured with a maximum bubble pressure method (BP-D5 by Harmony Interface Science Incorporated Company).

The treatment agent of the present invention can be appropriately used for substrates such as textiles and masonry, and gives excellent water- and oil-repellency to the substrates.

D. Working Example

The followings are examples which specifically explain the present invention. These examples do not limit the present invention.

In the following Examples, parts, % or ratio are parts by weight, % by weight or weight ratio, unless otherwise specified.

The properties were measured based on AATCC 123-2000 "Carpet Soiling: Accelerated Soiling Method" by using a standard carpet.

Soil Resistance

The swatches are soiled, cleaned, and ΔE was measured with a spectrophometer in accordance with AATCC 123-2000 "Carpet Soiling: Accelerated Soiling Method" (2007), which is incorporated herein in its entirety.

ΔE is the change in "cleanliness". So a zero would be perfect therefore the closer the numbers are to zero, the more like new the carpet looks. "Initial soil" is the ΔE measured after it is soiled. "Vacuum" is the ΔE measured after vacuuming. The lower ΔE ("Initial soil", "Vacuum") is, the better soil resistance is.

Alcohol Repellency (AR)

The alcohol repellency (AR) was evaluated by a penetration state of the test solution shown in the following Table after 10 seconds. The alcohol repellency is expressed by a maximum point of the test liquid which does not penetrate. The higher "AR" is, the better the alcohol repellency is.

Criteria Class of Alcohol Repellency

| Determined grade | Test solution | Surface tension (dyne/cm, 25° C.) |
| --- | --- | --- |
| 8 | 40:60/Water:IPA (vol/vol) | 24.0 |
| 7 | 50:50/Water:IPA (vol/vol) | 24.5 |
| 6 | 60:40/Water:IPA (vol/vol) | 25.4 |
| 5 | 70:30/Water:IPA (vol/vol) | 27.5 |
| 4 | 80:20/Water:IPA (vol/vol) | 33.0 |
| 3 | 90:10/Water:IPA (vol/vol) | 42.0 |
| 2 | 95:5/Water:IPA (vol/vol) | 50.0 |
| 1 | 98:2/Water:IPA (vol/vol) | 59.0 |
| 0 | None(fails 98 vol % water) | — |

IPA: Isopropanol

Synthesis Example 1

Stearyl acrylate (216 g) and glycidyl methacrylate (8 g) were reacted in water (420 g) containing an anionic surfactant (sodium olefin sulfonate) (18.8 g) and a nonionic surfactant (POE (3) tridecyl ether (7.6 g) and POE (20) lauryl ether (7.6 g)) to give an aqueous dispersion of a fluorine-free polymer. The aqueous dispersion contains 28.6 parts by weight of the fluorine-free polymer formed from stearyl acrylate and glycidyl methacrylate (weight ratio: 96.4/3.6) and 4.4 parts by weight of the surfactant (sodium olefin sulfonate to POE (3)tridecyl ether/POE (20) lauryl ether=2.4 to 1/1) in water.

Example 1

FLEXISPERSE PM-25 (an anionic emulsion comprising an anti-soiling polymer, available from Innovative Chemical Technologies of Cartersville, Ga., USA) was diluted with water to give a 6.66% solution. The solution was applied to a swatch of solution dyed, 25 osy (ounces per square yard) low profile, loop nylon carpet at 30% wet pick up. The swatch was dried/cured at 275 F for 8 minutes. The soil resistance and the alcohol repellency were determined. Results are shown in Table 1.

Example 2

The aqueous dispersion obtained in Synthesis Example 1 was diluted with water to give a 6.66% solution. The solution was applied to a swatch of solution dyed, 25 osy low profile, loop nylon carpet at 30% wet pick up. The swatch was dried/cured at 275 F for 8 minutes. The soil resistance and the alcohol repellency were determined. Results are shown in Table 1.

Example 3

The aqueous dispersion obtained in Synthesis Example 1 was mixed with FLEXISPERSE PM-25 (weight ratio of the fluorine-free polymer in the aqueous dispersion to the anti-soiling polymer in FLEXISPERSE PM-25 is 10/90), and then diluted with water to give a 6.66% solution. The solution was applied to a swatch of solution dyed, 25 osy low profile, loop nylon carpet at 30% wet pick up. The swatch was dried/cured at 275 F for 8 minutes. The soil resistance and the alcohol repellency were determined. Results are shown in Table 1.

Example 4

The aqueous dispersion obtained in Synthesis Example 1 was mixed with FLEXISPERSE PM-25 (weight ratio of the fluorine-free polymer in the aqueous dispersion to the anti-soiling polymer in FLEXISPERSE PM-25 is 20/80), and then diluted with water to give a 6.66% solution. The solution was applied to a swatch of solution dyed, 25 osy low profile, loop nylon carpet at 30% wet pick up. The swatch was dried/cured at 275 F for 8 minutes. The soil resistance and the alcohol repellency were determined. Results are shown in Table 1.

Example 5

The aqueous dispersion obtained in Synthesis Example 1 was mixed with FLEXISPERSE PM-25 (weight ratio of the fluorine-free polymer in the aqueous dispersion to the anti-soiling polymer in FLEXISPERSE PM-25 is 50/50), and then diluted with water to give a 6.66% solution. The solution was applied to a swatch of solution dyed, 25 osy low profile, loop nylon carpet at 30% wet pick up. The swatch was dried/cured at 275 F for 8 minutes. The soil resistance and the alcohol repellency were determined. Results are shown in Table 1.

TABLE 1

| Treatment | Initial Soil | Vacuum | AR |
|---|---|---|---|
| Untreated | 45 | 40 | 0 |
| Ex. 1 (PM-25 only) | 40.1 | 35 | 0 |
| Ex. 2 (Copolymer/surfactant) | 39.6 | 35.9 | 3 |
| Ex. 3 (Copolymer/surfactant + PM-25) | 38.4 | 32.5 | 3 |
| Ex. 4 (Copolymer/surfactant + PM-25) | 38.5 | 32.7 | 3 |
| Ex. 5 (Copolymer/surfactant + PM-25) | 40.7 | 30.1 | 4 |

AR = alcohol repellency.

PM-25 is an anionic emulsion comprising an anti-soiling polymer, and PM-25 comprises acrylate particles. PM-25 (Example 1) did not provide alcohol repellency and improved only soil resistance. The copolymer/surfactant blend (Example 2) provided alcohol repellency and soil resistance. The combination of PM-25 and the copolymer/surfactant blend (Examples 3-5) improved soil-resistance and alcohol repellency.

E. Exemplary Embodiments

Specific embodiments of the present invention are provided to allow a more complete understanding of the invention. It is to be understood that these examples are not limiting on the scope of the invention, and are provided merely to show specific support for specific versions of the invention.

1. A surface treatment agent which is an aqueous emulsion comprising:
   (a) a fluorine-free polymer comprising repeating units derived from a long-chain (meth)acrylate ester monomer represented by the formula:

$CH_2=CA^{11}\text{-}C(=O)\text{-}O\text{-}A^{12}$, wherein

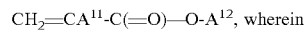

$A^{11}$ is a hydrogen atom or a methyl group, and
   $A^{12}$ is a linear or branched aliphatic hydrocarbon group having 18-30 carbon atoms;
   (b) a surface active agent comprising both of a nonionic surface active agent and an anionic surface active agent, wherein the amount of the anionic surface active agent is at least 15% by weight, based on the total of the nonionic surface active agent and the anionic surface active agent; and
   (c) a liquid medium comprising water.

2. The surface treatment agent according to embodiment 1, wherein the fluorine-free polymer comprises repeating units derived from a short-chain (meth)acrylate ester monomer represented by the formula:

$CH_2=CA^{21}\text{-}C(=O)\text{-}O\text{-}A^{22}$

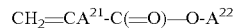

$A^{21}$ is a hydrogen atom or a methyl group, and
   $A^{22}$ is a linear or branched aliphatic hydrocarbon group having up to 18 carbon atoms.

3. The surface treatment agent according to any embodiment above, wherein the polymer further comprises repeating units derived from a fluorine-free crosslinkable monomer.

4. The surface treatment agent according to any embodiment above, wherein the polymer further comprises repeating units derived from a fluorine-free crosslinkable monomer that is a compound which has at least one ethylenically unsaturated carbon-carbon double bond.

5. The surface treatment agent according to any embodiment above, wherein the polymer further comprises repeating units derived from a fluorine-free crosslinkable monomer that is a compound which has at least one reactive group selected from the group consisting of a hydroxyl group, an epoxy group, a chloromethyl group, a blocked isocyanate group, an amino group and a carboxyl group.

6. The surface treatment agent according to any embodiment above, wherein the amount of the anionic surface active agent is at least 22% by weight, based on the total of the nonionic surface active agent and the anionic surface active agent.

7. The surface treatment agent according to any embodiment above, wherein the amount of the anionic surface active agent is at least about 33% by weight, based on the total of the nonionic surface active agent and the anionic surface active agent.

8. The surface treatment agent according to any embodiment above, wherein the long-chain (meth)acrylate ester monomer is at least about 40% of the total weight of the fluorine-free polymer.

9. The surface treatment agent according to any embodiment above, wherein the fluorine-free polymer (1) is free from a (meth)acrylate monomer having a cyclic hydrocarbon group.

10. The surface treatment agent according to any embodiment above, wherein the nonionic surface active agent is selected from the group consisting of ethers, esters, ester ethers, alkanolamides, polyhydric alcohols and amine oxides.

11. The aqueous emulsion treatment agent according to any embodiment above, wherein the nonionic surface active agent is a compound represented by the formula:

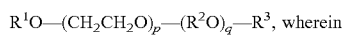

$R^1O-(CH_2CH_2O)_p-(R^2O)_q-R^3$, wherein $R^1$ is an alkyl group having 1-22 carbon atoms, an alkenyl group having 2-22 carbon atoms, or an acyl group, $R^2$ each is independently, the same or different, an alkylene group having at least 3 (for example, 3-10) carbon atoms, $R^3$ is a hydrogen atom, an alkyl group having 1-22 carbon atoms, or an alkenyl group having 2-22 carbon atoms, p is a number of at least 1, and q is a number of at least 0.

12. The surface treatment agent according to any embodiment above, wherein the anionic surface active agent is selected from the group consisting of an aliphatic monocarboxylate salt, a polyoxyethylene alkyl ether carboxylate salt, a N-acyl sarcosinate salt, a N-acyl glutamate salt, a dialkylsulfosuccinate salt, an alkanesulfonate salt, an alpha olefin sulfonate salt, a linear alkylbenzene sulfonate salt, a branched alkylbenzene sulfonate salt, a naphthalene sulfonate salt-formaldehyde condensate, an alkyl naphthalene sulfonate salt, a N-methyl-N-acyl taurine, an alkyl sulfate salt, a polyoxyethylene alkyl ether/sulfate salt, a fat and oil sulfuric ester salt, an alkyl phosphate salt, a polyoxyethylene alkyl ether phosphate salt, and a polyoxyethylene alkylphenylether phosphate salt.

13. The surface treatment agent according to any embodiment above, which does not contain a fluorine-containing polymer.

14. The surface treatment agent according to any embodiment above, which contains a fluorine-containing polymer.

15. The surface treatment agent according to any embodiment above, which is a water- and oil-repellent agent or a soil resistant agent.

16. A method of treating a textile, comprising treating the textile with the surface treatment agent according to any embodiment above.

19. A treated textile, comprising a textile that has been treated with the surface treatment agent according to any embodiment above.

F. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

The invention claimed is:

1. A surface treatment agent which is an aqueous emulsion comprising:

(1) a fluorine-free polymer consisting essentially of repeating units derived from:

(a) a long-chain (meth)acrylate ester monomer represented by the formula:

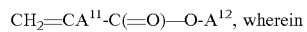

$CH_2=CA^{11}-C(=O)-O-A^{12}$, wherein $A^{11}$ is a hydrogen atom or a methyl group, and $A^{12}$ is a linear or branched aliphatic hydrocarbon group having 10-30 carbon atoms;

(c) a fluorine-free crosslinkable monomer that is a compound which has at least two olefinic carbon-carbon double bonds, at least two reactive groups, or at least one olefinic carbon-carbon double bond and at least one reactive group in which the reactive group is selected from the group consisting of a hydroxyl group, an epoxy group, a chloromethyl group, a blocked isocyanate group, an amino group, and a carboxyl group, and optionally (d) a halogenated olefin monomer, wherein the amount of the long-chain (meth)acrylate ester monomer (a) is at least 40% by weight, based on the polymer, and the amount of the fluorine-free crosslinkable monomer (c) is 0.5-20 parts by weight, and the amount of the halogenated olefin monomer (d) is 0-100 parts by weight, based on 100 parts by weight of the long-chain (meth)acrylate ester monomer (a), (2) a surface active agent comprising both of a nonionic surface active agent and an anionic surface active agent, wherein the nonionic surface active agent is selected from the group consisting of ethers, esters, ester ethers, alkanolamides, polyhydric alcohols and amine oxides, the amount of the surface active agent is from 1 to 20 parts by weight, based on 100 parts by weight of the polymer, and the amount of the anionic surface active agent is at least 15% by weight and at most 70% by weight, based on the total of the nonionic surface active agent and the anionic surface active agent; and (3) a liquid medium comprising water.

2. The surface treatment agent according to claim 1, wherein the fluorine-free polymer further comprises repeating units derived from a short-chain (meth)acrylate ester monomer represented by the formula:

$$CH_2=CA^{21}\text{-}C(=O)\text{-}O\text{-}A^{22}$$

$A^{21}$ is a hydrogen atom or a methyl group, and $A^{22}$ is a linear or branched aliphatic hydrocarbon group having 1 to 9 carbon atoms.

3. The surface treatment agent according to claim 1, wherein the fluorine-free crosslinkable monomer is at least one selected from the group consisting of diacetone(meth)acrylamide, N-methylol(meth)acrylamide, hydroxymethyl (meth)acrylate, hydroxyethyl (meth)acrylate, 3-chloro-2-hydroxypropyl (meth)acrylate, 2-acetoacetoxyethyl (meth)acrylate, butadiene, isoprene, chloroprene, monochlorovinyl acetate, vinyl methacrylate, glycidyl (meth)acrylate, 1,6-hexanediol di(meth)acrylate, and neopentylglycol di(meth)acrylate.

4. The aqueous emulsion treatment agent according to claim 1, wherein the nonionic surface active agent is a compound represented by the formula:

$$R^1O\text{-}(CH_2CH_2O)_p\text{-}(R^2O)_q\text{-}R^3, \text{ wherein}$$

$R^1$ is an alkyl group having 1-22 carbon atoms, an alkenyl group having 2-22 carbon atoms, or an acyl group, $R^2$ each is independently, the same or different, an alkylene group having at least 3 carbon atoms, $R^3$ is a hydrogen atom, an alkyl group having 1-22 carbon atoms, or an alkenyl group having 2-22 carbon atoms, p is a number of at least 1, and q is a number of at least 0.

5. The surface treatment agent according to claim 1, wherein the anionic surface active agent is selected from the group consisting of an aliphatic monocarboxylate salt, a polyoxyethylene alkyl ether carboxylate salt, a N-acyl sarcosinate salt, a N-acyl glutamate salt, a dialkylsulfosuccinate salt, an alkanesulfonate salt, an alpha olefin sulfonate salt, a linear alkylbenzene sulfonate salt, a branched alkylbenzene sulfonate salt, a naphthalene sulfonate salt-formaldehyde condensate, an alkyl naphthalene sulfonate salt, a N-methyl-N-acyl taurine, an alkyl sulfate salt, a polyoxyethylene alkyl ether/sulfate salt, a fat and oil sulfuric ester salt, an alkyl phosphate salt, a polyoxyethylene alkyl ether phosphate salt, and a polyoxyethylene alkylphenylether phosphate salt.

6. The surface treatment agent according to claim 1, wherein the monomer in the fluorine-free polymer is a combination of the monomer (a)+the fluorine-free crosslinkable monomer (c).

7. The surface treatment agent according to claim 1, wherein the amount of the monomer (a) is at least 50% by weight, based on the polymer, and the amount of the fluorine-free crosslinkable monomer (c) is 1-10 parts by weight, and the amount of the repeating unit (d) is 1-30 parts by weight, based on 100 parts by weight of monomer (a).

8. The surface treatment agent according to claim 1, which does not contain a fluorine-containing polymer.

9. The surface treatment agent according to claim 1, which contains a fluorine-containing polymer.

10. The surface treatment agent according to claim 1, which is a water-and oil-repellent agent or a soil resistant agent.

11. A surface treatment composition comprising the surface treatment agent according to claim 1, and an anionic emulsion comprising an anti-soiling polymer.

12. The surface treatment composition according to claim 11, wherein the anti-soiling polymer is a fluorine-free acrylate polymer, and the anionic emulsion comprises one or both of an anionic polymer and an anionic surfactant.

13. The surface treatment composition according to claim 11, wherein the anti-soiling polymer comprises micro-scale particulates having a medium particle size of at most 100 μm.

14. The surface treatment composition according to claim 11, wherein the weight ratio of the fluorine-free polymer in the surface treatment agent to the anti-soiling polymer is 1:99 to 90:10.

15. A method of treating a textile, comprising treating the textile with the surface treatment agent according to claim 1.

16. A treated textile prepared by the method according to claim 15, wherein the fluorine-free polymer in the treatment agent is penetrated into internal parts of the textile and/or adhered to surfaces of the textile.

17. The treated textile according to claim 16, wherein the textile is a carpet.

* * * * *